United States Patent [19]

Marukawa et al.

[11] 4,225,565

[45] Sep. 30, 1980

[54] PROCESS FOR TREATING WASTE SLAGS

[75] Inventors: Katsukiyo Marukawa; Setsuo Okamoto, both of Ibaragi; Kazunari Yamada; Masahisa Iba, both of Tokuyama, all of Japan

[73] Assignees: Tokuyama Soda Company Limited, Tokuyama; Sumitomo Metal Industries Limited, Osaka, both of Japan

[21] Appl. No.: 6,293

[22] Filed: Jan. 25, 1979

[30] Foreign Application Priority Data

Jan. 26, 1978 [JP] Japan .................................... 53-7707
Dec. 27, 1978 [JP] Japan ................................ 53-160117

[51] Int. Cl.$^2$ ............................................. C01D 7/00
[52] U.S. Cl. .................................. 423/208; 423/189; 423/209
[58] Field of Search ............... 423/421, 208, 209, 189, 423/425

[56] References Cited

U.S. PATENT DOCUMENTS 3,701,737   10/1972   Goldstein ............................ 423/425

FOREIGN PATENT DOCUMENTS 37-161054   7/1962   Japan ...................................... 423/421
53-8307    of 1978   Japan ...................................... 423/421
776331     6/1957   United Kingdom ..................... 423/421

Primary Examiner—Wayne A. Langel
Attorney, Agent, or Firm—J. Harold Nissen

[57] ABSTRACT

In the treating of waste slags produced in the desulfurization and/or dephosphorization of molten pig iron with alkali carbonates, the alkali is recovered by extracting said waste slags with hot water while feeding carbon dioxide gas to form an extraction solution having a pH of 9.0–11.5 and recovering alkali carbonates from said extraction solution. The extraction solution contains little sulphur and silicates, from which alkali carbonates can be easily recovered with high yield therefrom.

17 Claims, 1 Drawing Figure

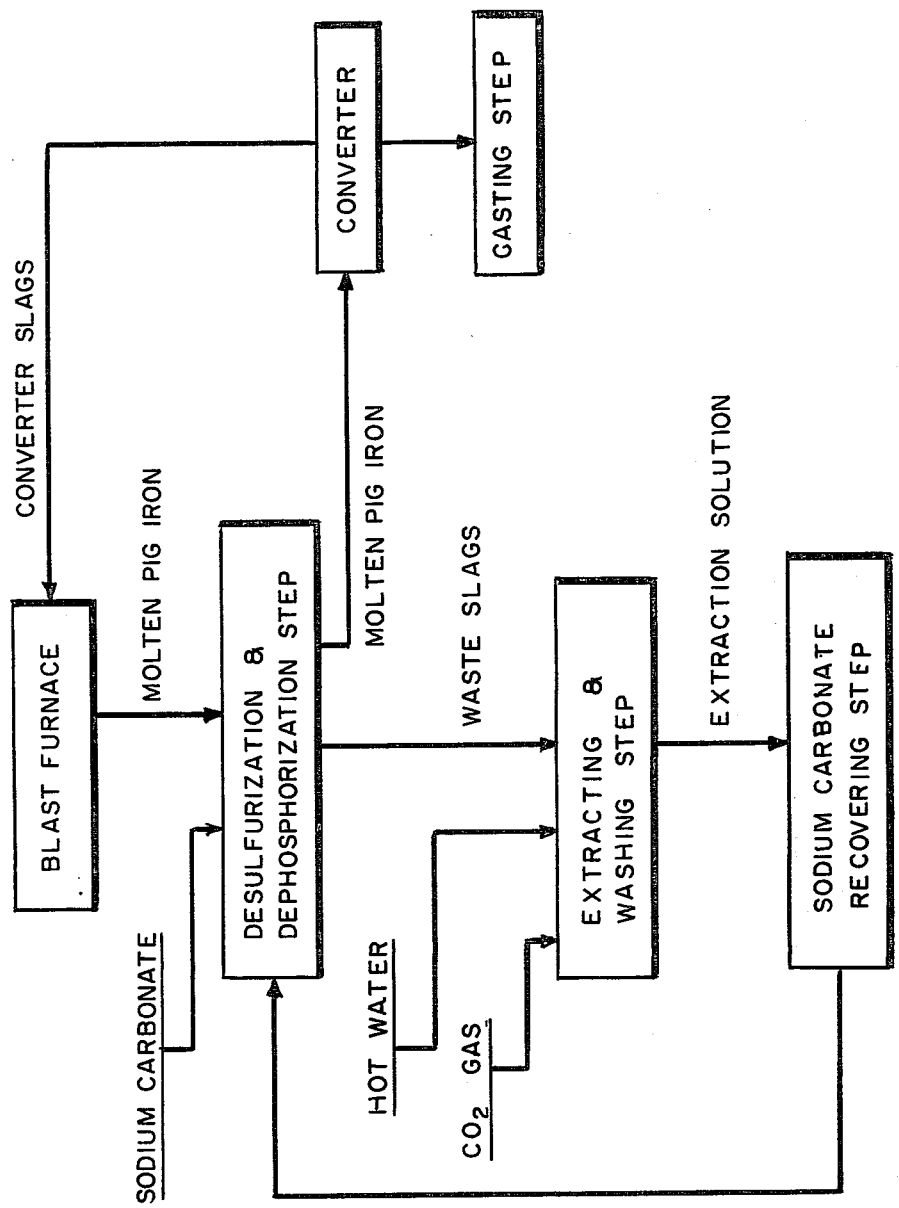

PROCESS FOR TREATING WASTE SLAGS

BACKGROUND OF THE INVENTION

This invention relates to a process for treating waste slags produced in the desulfurisation and/or dephosphorisation of molten pig iron with alkali carbonates thereby to recover the alkali.

Generally, pig iron includes 3.7–4.8% by weight of C, 0.3–1.0% by weight of Si, 0.2–0.8% by weight of Mn, 0.02–0.05% by weight of S and 0.10–0.18% by weight of P. The presence of sulphur results in the lowering of hot working performance and impact strength of steel and the presence of phosphorous brings about deterioration of a property such as toughness on steel. Accordingly, it is desirable that the sulphur and phosphorus in pig iron are removed as much as possible for a high grade steel.

The desulfurisation of molten pig iron has hitherto been conducted at the outside of a furnace using sodium carbonate or calcium oxide. However, since waste slags produced by this treatment includes large quantities of soda, it needs severe managements to discard. On the other hand, phosphorus has been removed by charging calcium oxide into a converter or by double slag method. However, waste slags produced in the basic oxygen process (hereinafter referred to as converter slag) includes phosphorus so that it cannot be fed into a blast furnace and, further, it needs severe managements to discard.

Also, Japanese Pat. No. 161054 discloses recovering sodium bicarbonate from waste slags produced in the desulfurisation of molten pig iron with sodium carbonate. This method includes the steps of blowing $O_2$ gas into waste slags to oxidize, effecting extraction with hot water while adding $CO_2$ gas and oxygen, concentrating the extraction solution and effecting fractional crystallization. However, according to this technique, the waste slag becomes sticky as it breaks down in the oxidation step so that much power is required for stirring and, further, there is required a considerable electric energy to feed an amount of oxygen sufficient for intimately contacting the waste slag with oxygen and, moreover, a long time for reaction is necessary.

Further, processes for recovering alkali from waste slags are disclosed in Japanese Pat. Kokai Nos. 52-148498 and 53-8307, in which the alkali is recovered by treating waste slags with hot water to extract the alkali and feeding $CO_2$ gas into the extraction solution to deposit the alkali.

However, according to these processes, an extraction rate of alkali is low and a large quantity of hot water and $CO_2$ gas is necessary and, further, there is disadvantages that the alkali recovered cannot be reused because of being in the form of bicarbonate so that it must be calcined for recycle. Furthermore, with the hot water treatment, the silica and sulphur of waste slag are also extracted and therefore, a step for separating and removing them is necessary. Under such circumstances, it was difficult to recover alkali metals in the form of alkali carbonates from waste slags in an industrial scale.

On the other hand, a process for effecting the desulphurisation of molten pig iron simultaneously with dephosphorisation is disclosed in, for example, Japanese Patent Kokai No. 52-127420. This process requires an amount of sodium carbonate of 4–5 times as compared with the case of effecting the desulphurisation only and therefore, there is an economic problem for practice in an industrial scale. Accordingly, developments of new techniques recovering sodium carbonate are requested for reducing an amount of sodium carbonate to be used and making an economical practice possible.

SUMMARY OF THE INVENTION:

An object of this invention is to provide a process for treating waste slags obtained in desulfurisation and/or dephosphorisation of molten pig iron with alkali carbonates thereby effectively recovering the alkali in the form of alkali carbonates from the waste slag and for making an economical practice possible.

The foregoing can be attained by treating the waste slag after desulfurisation and/or dephosphorisation with hot water while blowing $CO_2$ gas thereinto to obtain an extraction solution of alkali carbonate having a pH of 9.0–11.5 and recovering alkali carbonates from said extraction solution. According to this invention, silicates of the waste slag are hardly extracted and extraction of the sulphur is controlled to a lower level. Also, the alkali is recovered in the form of alkali carbonates without converting to alkali bicarbonates.

BRIEF DESCRIPTION OF THE DRAWING

The accompanying drawing represents a flow sheet for recovering sodium carbonate from waste slags after desulfurisation and dephosphorisation.

DETAILED DESCRIPTION OF THE INVENTION

In the extraction solution obtained according to this invention, the sulphur of waste slag is slightly extracted and silicates are hardly extracted and accordingly, the extraction solution may be, as it is, subjected to crystallization or fractional crystallization to recover alkali carbonates and alkali phosphates.

Alternatively, since said extraction solution has a pH of 9.0–11.5, an iron ion may be added thereto without adjusting a pH whereby the sulphur and phosphorus present are deposited and separated as iron sulfide and iron phosphate, respectively. The preferred embodiment of this invention includes the steps of removing the sulphur and phosphorus of the extraction solution as mentioned above and effecting flash drying or fractional crystallization to recover alkali carbonates.

Though the alkali carbonate which may be used in this invention is sodium carbonate or potassium carbonate, sodium carbonate is preferred in the light of an economical view.

The following is directed to the treatment of waste slags obtained in effecting desulfurisation simultaneously with dephosphorisation by sodium carbonate. When desulfurisation is effected simultaneously with dephosphorisation, there are advantages that since converter slags contain little phosphorus, they can be reused as feeding materials to the blast furnace, that steps are simplified as compared with the case of effecting the desulfurisation and the dephosphorisation separately, and that a temperature lowering of molten pig iron which is of importance in the refining process is small.

The accompanying drawing represents a flow sheet for recovering sodium carbonate from waste slags which are obtained in the desulfurisation effected simultaneously with dephosphorisation, and it is of course that various changes may be made without departing from the scope of this invention, if necessary.

Molten pig iron obtained in the blast furnace is conveyed to a desulfurisation and dephosphorisation step. Sodium carbonate is added in an amount of normally, 15-45 kg per ton of molten pig iron and stirring is effected for 5-10 minutes, whereby sulphur and phosphorus in the pig iron are converted to sodium sulfide and sodium phosphate, respectively. At this time the desulfurised and dephosphorised pig iron is conveyed to a converter, which is then refined in the conventional method, for example, by adding calcium oxide and then conveyed to a casting step.

Since converter slags contain little phosphorus, they can be recycled to the blast furnace. Also, using alkali bicarbonates instead of alkali carbonates in the desulfurisation and dephosphorisation step may be considered, but it is not desirable because the former must be used in large quantities as compared with the latter and also, it results in large quantities of gas and lowering in temperature.

The waste slags from the desulfurisation and dephosphorisation step are fed to an extracting and washing step, which are then treated and extracted with hot water while blowing in a $CO_2$ gas containing gas.

An amount of hot water may be more than about 0.8 tons per ton of waste slag.

When hot water is used too much, apparatus become excessive and post-treatments are troublesome. Therefore, normally 0.8-5.5 tons, preferably 1.5-3.5 tons per ton of waste slag are used.

Since cold water has a poor dissolving ability, it should be heated when used.

It is effective to extract and wash with hot water of temperatures of 40°-100° C., preferably 80°-100° C. Also, a waste hot water producing in iron and steel making works may be effectively employed as a source of hot water.

One of the characteristics of this invention is to feed $CO_2$ gas in the extracting and washing step thereby to maintain a pH of the extraction solution at 9.0-11.5. When $CO_2$ gas is excessively blown in till a pH has reached less than 9.0, bicarbonates are formed so that treatments after recovery become troublesome. On the other hand, when $CO_2$ gas is fed in lesser amounts so as to maintain a pH more than 11.5, the extraction rate of alkali is low and silicates are extracted so that subsequent steps become complicated. In order to prevent the extraction of silicates as completely as possible, a pH of 9.5-10.3 is preferred.

Thus, when waste slags are treated by hot water simultaneously with blowing $CO_2$ gas and a feeding amount of $CO_2$ gas is adjusted so as to maintain a pH of the extraction solution at 9.0-11.5 preferably, 9.5-10.3, the sulphur of waste slag is controlled to a lower level of extraction and silicates are not substantially extracted while unreacted alkali is extracted as carbonates. The resulting extraction solution includes sodium carbonate, phosphates and a small amount of sulphur.

As to carbon dioxide gas, a 5% (V/V) or more $CO_2$ gas containing gas may be conveniently used.

A waste combustion gas from hot stoves attached to the blast furnace may be used as a source of gas, which is also employed as a source of heat and advantageous economically.

As to a preferred embodiment, for example, a 5-30 % $CO_2$ gas containing gas may be fed in an amount of 2,000-20,000 $Nm^3$, preferably 5,000-15,000 $Nm^3$ per ton of waste slag. The extraction solution obtained thus has a pH of 9.0-11.5, at the pH of which insoluble residues are readily removed due to the good precipitability and also, sodium carbonate is not converted to sodium bicarbonate.

Though an extracting and washing apparatus is not particularly limited, a screw conveyer type is preferred to a rotary cylinder type because the former has good workability.

Two or more extracting apparatus may be connected in series to effect the extracting and washing more completely.

Waste slags after the extracting and washing are small in quantity and made harmless so that they can be discarded as they are.

The extraction solution contains mainly sodium carbonate and besides, a small amount of sodium sulfide and sodium phosphate are included.

Next, means for recovering sodium carbonate from the extraction solution will be explained. In case only the desulfurisation has been conducted, the extraction solution containing a small sulphur content may be directly evaporated and concentrated to deposit sodium carbonate and if desired, sulfides are washed and separated, or the extraction solution may be subject to fractional crystallization thereby to recover sodium carbonate.

In case both of desulfurisation and dephosphorisation have been conducted, since the extraction solution contains sodium phosphate, materials such as calcium oxide, calcium hydroxide or calcium carbonate are added thereto, calcium phosphate is deposited by fractional crystallization and thereafter, sodium carbonate is recovered.

Another embodiment for recovering sodium carbonate includes the steps of adding an iron ion to the extraction solution to precipitate the sulfur as iron sulfide and the phosphorus as iron phosphate and then recovering sodium carbonate.

According to this method, there is no necessity for providing a preliminary oxidation step and the operation is simple. Further, the fractional crystallization of sodium carbonate can be conveniently conducted because the sulphur and phosphorus present are removed prior to the fractional crystallization.

Since a pH of the extraction solution is within the range of 9.0-11.5, precipitates may be conveniently deposited by an iron ion without adjusting a pH. Of course, a pH may be appropriately adjusted, if necessary.

Examples of a source of iron ion which may be used includes iron chloride, iron sulfate and the like. Since the use of iron chloride is expensive and also results in an increase in chlorine content of the recovered sodium carbonate, iron sulfate is preferred. If an increase in sulfate content of the solution due to the use of iron sulfate causes trouble in reusing the recovered product, such sulfates may be removed as sodium sulfate by fractional crystallization.

Generally, a source of iron ion may be used in an amount of 1 to 100 kg per ton of waste slag.

The filtrate obtained in the above steps is concentrated and fed to a fractional crystallization step. It is desirable for the filtrate to effect concentration till it partially deposits. Apparatus for concentration are not particularly limited. When a spraying tower concentrator is used, even a partially crystallized suspension can be conveniently concentrated without danger of the piping blocking. Hot gas to be fed to the concentration apparatus is not limited provided that it contains no sulphur and is inert to the solution.

Since waste gas from a blast furnace, hot stove, converter or air-heating furnace contains little sulphur, it can be advantageously and economically used.

Alternatively, a fluidized drying granulator instead of the fractional crystallization step may be used for recovering sodium carbonate.

When waste slags produced in the treatment of desulfurisation and/or dephosphorisation of molten pig iron with alkali carbonates are allowed to stand for a long time, in some cases, a part of the sulphur content is oxidised by oxygen in air to form thiosulfates and sulfites. This invention may be applied to such waste slags without any convenience.

For example, in the alkali extraction treatment of said waste slag the sulphur is dissolved as sulphur ion, thiosulfate iron and sulfite iron. An amount of these ions, however, is only several percents relative to an amount of the alkali carbonate present and therefore, a solid alkali carbonate can be recovered by subjecting the extraction solution as it is to concentration by evaporation or to fractional crystallization. Also, sulphur iron is precipitated by adding an iron ion and then, with concentration by evaporation or fractional crystallization alkali carbonates may be recovered.

As mentioned above, the simultaneous desulfurisation and dephosphorisation of molten pig iron results in the simplifying of steps and also, as to a large quantity of sodium carbonate required due to the simultaneous desulfurisation and dephosphorisation, unreacted sodium carbonate can be recovered and reused according to this invention.

Further, the converter slag contains little phosphorus so that it can be recycled to the blast furnace.

Thus, the process of this invention has technical advance and economical advantages.

The waste sludge obtained in the extracting and washing step can be voluntarily discarded because of not containing soluble alkalis, sulphur and phosphorus. Further, since the waste sludges after treatment are small in quantity, they cause no trouble of environmental pollution.

There are, also, advantages that since iron sulfide and iron phosphate are easily precipitated by adding an iron ion to the extraction solution without adjusting a pH, alkali carbonates are obtained with high purity.

This invention will be illustrated by the following non-limitative examples.

EXAMPLE 1

1.0 ton of molten pig iron containing 400 g (0.04 wt. %) of sulphur and 1200 g (0.12 wt. %) of phosphorus was subjected to desulfurisation and dephosphorisation with 30 kg of sodium carbonate. 30 kg of waste slag were obtained. Using a screw conveyer type of extracting and washing apparatus, the waste slags were treated with 50 kg of hot water of 90° C. for 30 minutes while blowing in a 15% $CO_2$ gas containing gas of 300° C.

With this treatment a pH of the extraction solution obtained was maintained at 10.1 and silicates were not extracted while the extract of sulphur was about 20% by weight of the total sulphur content. On the other hand, phosphorus was extracted as sodium phosphate in the liquid phase.

Next, when 6.5 kg of ferrous sulfate were added to the extraction solution, sulphur and phosphorus were deposited as 160 g of iron sulfide and 4000 g of iron phosphate, respectively.

After filtering the deposits, the filtrate was concentrated to a weight of 40 kg with a spraying tower concentrator. At this time waste gas of 300° C. as a source of hot air was used. The composition of the solution obtained was 31% sodium carbonate and 0.7% sodium bicarbonate.

17 kg of sodium carbonate were recovered by fractional crystallization of the concentrated solution thus obtained. The mother liquor, after separation of sodium carbonate, was recycled as a part of the hot water for extraction.

EXAMPLE 2

1.0 ton of molten pig iron containing 300 g (0.03 wt. %) of sulphur and 1100 g (0.11 wt. %) of phosphorus was subjected to desulfurisation and dephosphorisation with 25 kg of sodium carbonate.

27 kg of waste slag containing 210 g of sulphur and 750 g of phosphorus were obtained. Using a screw conveyer type of extracting and washing apparatus, the waste slags were treated with 45 kg of hot water of about 80° C. while blowing in a 15% $CO_2$ gas containing gas of 300° C. Of 45 kg of hot water 15 kg were fed in the form of steam. With this treatment a pH of the extraction solution obtained was maintained at 10.2.

Sulfur was hardly extracted, while phosphorus and sodium were converted to sodium phosphate and sodium carbonate, respectively, which were then immigrated to the liquid phase.

When 3.7 kg of calcium hydroxide were added to the liquid phase, phosphoric ion was deposited as calcium phosphate. After filtering, the aqueous solution was evaporated to dryness and 20 kg of sodium carbonate of a 96% purity were recovered.

What is claimed is:

1. A process for treating waste slags produced in the desulfurisation and/or dephosphorisation of molten pig iron with alkali carbonates, which comprises treating said waste slag with hot water while feeding carbon dioxide gas to form an extraction solution of alkali carbonate having a pH of 9.0–11.5 and recovering alkali carbonates from said extraction solution.

2. The process of claim 1 wherein the carbon dioxide gas is fed so as to form an extraction solution having a pH of 9.5–10.3.

3. The process of any one of claims 1 and 2 wherein the carbon dioxide gas is fed as a 5% (V/V) or more $CO_2$ gas containing gas.

4. The process of claim 3 wherein waste gas from a hot stove attached to a blast furnace is used as said $CO_2$ gas containing gas.

5. The process of claim 4 wherein a 5–30% (V/V) $CO_2$ gas containing gas is fed in an amount of 2,000–20,000 $Nm^3$ per ton of waste slag for said extraction treatment.

6. The process of claim 1 wherein alkali carbonates are recovered by adding an iron ion to said extraction solution to deposit iron sulfide and/or iron phosphate, removing the deposits by filtration and recovering alkali carbonates from the filtrate.

7. The process of claim 6 wherein said filtrate is concentrated and subjected to fractional crystallization to recover alkali carbonates.

8. The process of claim 6 wherein iron sulfate is used as a source of iron ion.

9. The process if claim 6 wherein said filtrate is concentrated by evaporation to recover a solid alkali carbonate.

10. The process of claim 1 wherein 0.8–5.5 tons of hot water of 40°–100° C. per ton of waste slag are used for said extraction treatment.

11. The process of claim 1 wherein 1.5–3.5 tons of hot water of 80°–100° C. per ton of waste slag are used for said extraction treatment.

12. The process of claim 1 wherein said extraction solution of alkali carbonate is concentrated by evaporation to recover a solid alkali carbonate.

13. The process of claim 1 wherein said extraction solution of alkali carbonate is concentrated and subjected to fractional crystallization to recover alkali carbonates.

14. The process of claim 1 wherein said alkali carbonate is a sodium carbonate.

15. The process of claim 1 wherein the recovered alkali carbonates are used for the treatment of desulfurisation and/or dephosphorisation of molten pig iron.

16. The process of claim 3 wherein a 5–30% (V/V) $CO_2$ gas containing gas is fed in an amount of 2,000–20,000 $Nm^3$ per ton of waste slag for said extraction treatment.

17. The process of any one of claims 12, 13, 9 and 7 wherein said concentration is effected by feeding a waste hot gas produced in an iron mill into a spraying tower concentrator and feeding the filtrate into said tower.

* * * * *